United States Patent [19]

Tamamori

[11] Patent Number: 4,467,832
[45] Date of Patent: Aug. 28, 1984

[54] COCK

[75] Inventor: Hideo Tamamori, Kobe, Japan

[73] Assignee: Nippon Air Brake Co., Ltd., Kobe, Japan

[21] Appl. No.: 409,396

[22] Filed: Aug. 19, 1982

[51] Int. Cl.³ ............................................. F16K 11/00
[52] U.S. Cl. .............................. 137/625.47; 251/174; 251/309
[58] Field of Search ............... 251/174, 309, 181, 183; 137/625.47

[56] References Cited

U.S. PATENT DOCUMENTS

| 2,876,985 | 3/1959 | Birchall | 251/181 X |
| 3,066,909 | 12/1962 | Reed | 251/309 |
| 3,305,211 | 2/1967 | Phillips | 251/309 |
| 3,479,006 | 11/1969 | Brown | 251/174 |
| 3,974,869 | 8/1976 | Abe | 251/309 |

Primary Examiner—Harold W. Weakley
Attorney, Agent, or Firm—A. G. Williamson, Jr.

[57] ABSTRACT

An elastomeric sleeve is inserted in the hole in the cock body which has multiple passages for the fluid. A plug, which may be positioned to connect selected passages, is placed within the sleeve in the hole. Either the contacting surfaces between the hole and sleeve or the rubbing surfaces between the sleeve and plug are tapered. A spring, seated on the base of the body or a plug flange, exerts upward pressure on the sleeve to assure tight contact between adjacent surfaces to eliminate fluid leaks.

4 Claims, 4 Drawing Figures

COCK

FIELD OF THE INVENTION

My invention pertains to an improved cock. More particularly, the invention relates to cock or valve apparatus, for selectively connecting passages in fluid transmission systems, which includes a tapered elastomeric seal insert between the cock body and operating plug to reduce wear and maintain the fluid seal.

BACKGROUND OF THE INVENTION

Known in the prior art is a cock or valve in which the plug is inserted into a tapered hole within a sleeve previously placed in the hole. The different connections between the fluid, air or liquid passages are made by turning the plug. All parts in this cock are made of metal with the contacting and the rubbing surfaces specially treated to avoid fluid leaks. However, any pollutant or foreign material in the fluid may stick to the metal surfaces, causing damage at least to the treated surfaces and thus creating leaks. Retreatment of the surfaces is possible but this frequently changes the diameters of the hole, sleeve, and/or plug, so that the parts do not fit tightly and replacement is required. One solution was to install a spring to provide firmer contact between the various surfaces, but this can greatly increase the operating force required. In another solution, the rubbing surface of the plug is made spherical in shape and an elastic valve seat used to bring the metal surface and spring surface into contact. This does produce tighter contact between contacting and rubbing surfaces, does not require special surface treatment, and reduces the required operating force. However, this ball cock has smaller contacting surfaces so that it is difficult to close each passage tightly to prevent fluid leaks. The ball cock is not usable for 3- and 4-way cocks with multiple passage ways. There is a need, therefore, for a cock with multiple passages which overcomes these deficiencies.

Accordingly, an object of my invention is an improved cock which eliminates the necessity for treatment of contacting and rubbing surfaces while maintaining tight seals to avoid fluid leaks.

Another object of this invention is a cock in which an elastomeric sleeve is inserted between the surface of the hole in the cock body and the operating plug mounted in the hole with a free turning movement to connect the several passages, and with spring pressure to assure a close fit between contacting and rubbing surfaces of the three elements, one pair of such surfaces being tapered.

Other objects, features, and advantages of the invention will become apparent from the following specification and appended claims when taken in connection with the accompanying drawings.

SUMMARY OF THE INVENTION

To practice the invention, a cock device has been developed which may be summarized as follows. Between the hole inside the cock body and the cock plug, a sleeve formed with an elastomeric material, e.g., rubber, is inserted. At least one set of the adjacent surfaces, that of the cock body and the sleeve or that of the rubbing surfaces of the sleeve and the cock plug, is tapered. A pushing means, e.g., a spring, is installed in the cock body to bring into contact under pressure the cock body and the sleeve, and the sleeve and the cock plug. This structure allows the contacting surfaces and the rubbing surfaces to have a metal-to-elastic contact, thus providing a better and tighter contact. In this way, the need to provide special treatment for the metal surfaces is eliminated and fluid leaks are prevented. Also, the structure reduces pressure on the pusher spring and lightens the cock plug operation. Furthermore, the contacting surfaces are spacious enough to provide multiple fluid passages on them so that this device is adaptable to 3-way and 4-way cocks.

BRIEF DESCRIPTION OF THE DRAWINGS

Prior to defining the invention in the appended claims, I will describe a specific arrangement, and one modification thereof, of an improved cock embodying the features of the invention, as illustrated in the accompanying drawings, in which:

In each of the drawing figures, similar reference characters designate the same or similar parts of the apparatus.

DESCRIPTION OF THE ILLUSTRATED EMBODIMENTS

Figure 1:
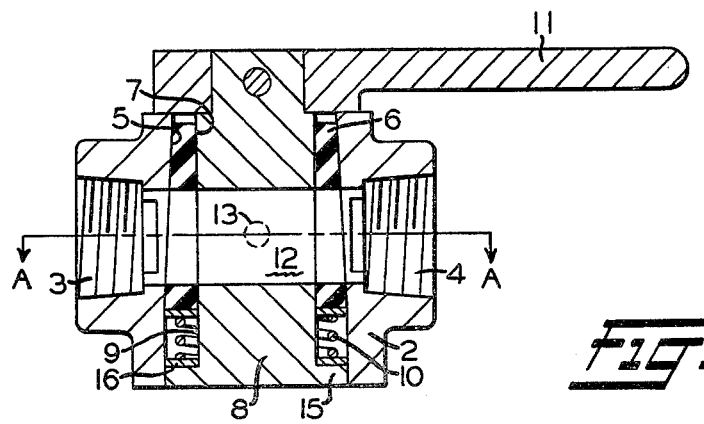
FIG. 1 shows, in vertical cross section, one form of a cock embodying the invention.
Figure 2:
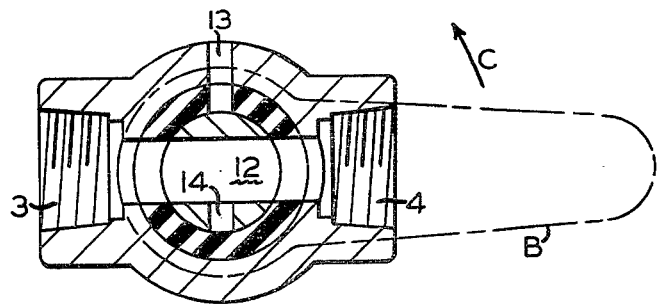
FIG. 2 shows a horizontal cross section of the cock along line A—A of FIG. 1.

Referring to FIG. 1, there is shown a vertical cross section of a cock embodying all the major features of the invention, and including a first form of taper arrangement. Reference is also made to FIG. 2, which is a horizontal cross section along line A—A of FIG. 1, as the various features are described. Fluid passages 3, 4, and 13 and a tapered hole 5 are provided in the body 2 of the cock. Inside the hole 5 is installed a sleeve 6 which is made of an elastomeric material such as rubber or synthetic resin. Installed inside the sleeve 6 is a cylindrical cock plug 8 which has a rubbing surface 9 in contact with inner surface 7 of the sleeve. As further shown in FIGS. 1 and 4, an annular space is formed at the upper end of the elastomeric sleeve 6 by an interior surface of the cock body 2, the top of the sleeve 6 and the outer surface of the plug 8. This annular space allows the sleeve 6 to move upwardly as wear on the sleeve 6 and the inside surface of the cock body 2 on the outer surface of the plug 8 occurs. In addition, an annular space is formed at the bottom of the elastomeric sleeve 6 by the interior surface of the cock body 2, the bottom of the sleeve 6 and the outer surface of the plug 8. A spring 10 is placed in the annular space between the bottom of sleeve 6 and the flange part 15 of the cock plug 8 to push up sleeve 6 from the end with a larger sleeve diameter toward the end with a smaller sleeve diameter. Pressure plates such as 16, against which the spring bears, may be used. Alternatively, instead of spring 10, an elastic material such as rubber can be used as the pusher. Consequently, the outer surface of the sleeve 6 is brought by pressure into contact with the inner surface of hole 5 in cock body 2 and the inner surface 7 of sleeve 6 is brought by pressure into contact with the outer surface 9 of the cock plug 8. Therefore, the contacting surfaces of body 2 and sleeve 6 and the rubbing surfaces 7 and 9 are in metal-to-elastomeric material, e.g., rubber contact. Tighter contact is easily made between the elastic material and metal, much better than that between metal and metal. Consequently, this structure can prevent fluid leaks. Further, the contacting surfaces between body 2 and sleeve 6 and between sleeve 6 and plug 8 are large enough to provide space for the passages 3, 4, and 13 to be shut off tightly. In addition to this, the pressure of spring 10 which works on sleeve 6 does not have to be as great as in the case with metal-to-metal contact. Therefore, the operation of the cock plug is easy.

Figure 3:
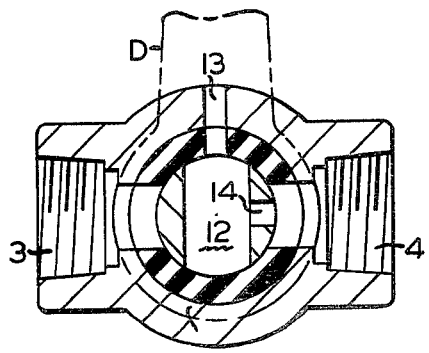
FIG. 3 is a similar cross section along line A—A of FIG. 1, but with the operating handle moved 90° counterclockwise.

When the handle 11, which is fixed firmly to the cock plug 8, is in position B as shown in FIG. 2, fluid passage 3 is connected to fluid passage 4 through the connecting passage 12. When handle 11 is moved in the direction of the arrow C, to position D, as in FIG. 3, fluid passage 4 is connected to fluid passage 13 via the hole 14 in cock plug 8 and the connecting passage 12. The fluid passage 3 is closed.

Figure 4:
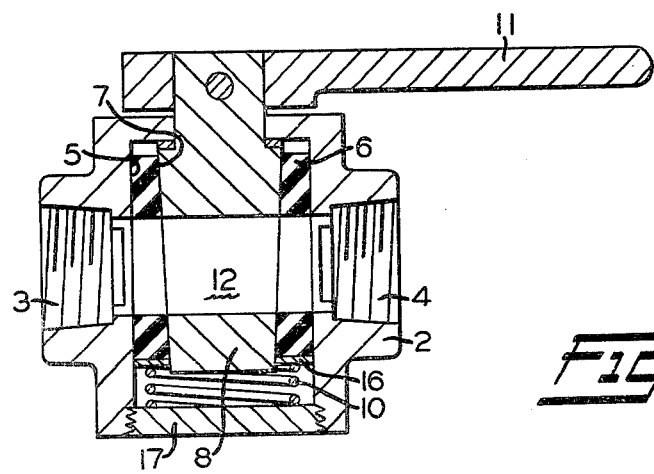
FIG. 4 is another vertical cross section illustrating a modification of the cock shown in FIG. 1.

In the form shown in FIG. 1, the contacting surfaces of the cock body 2 and the sleeve 6 are tapered, i.e., the surface of hole 5 and the outer surface of the sleeve. As an alternate, the rubbing surfaces 9 and 7 of cock plug 8 and sleeve 6, respectively, can be tapered, as shown in FIG. 4. In other words, either side of the sleeve can be tapered. The arrangement of FIG. 4 also differs in that a threaded plug 17, against which spring 10 bears directly, closes the bottom of the somewhat differently shaped cock body 2.

As described, a cock of this design has the following improved structure. A tapered sleeve, on at least one side, which is made of an elastomeric material, such as rubber, is installed between the cock body and the cock plug. The contacting surfaces of the cock body and the sleeve, and the rubbing surfaces of the sleeve and the cock plug, are brought into contact by pressure. Metal-to-rubber contact in this device eliminates the damage on the rubbing metal surfaces caused by pollutants in the fluid, and gives tighter contact for the contacting parts and the rubbing parts. Therefore, this type of cock can better prevent fluid leaks. Special treatment for the rubbing surfaces is no longer necessary. Contacting pressure is reduced, and the cock plug operation becomes easy. Furthermore, this cock can be used for multiple fluid passages.

Although I have herein shown and described but one form of a cock embodying the invention, and one minor modification thereof, it is to be understood that various other changes and modifications, within the scope of the appended claims, may be made without departing from the spirit and scope of the invention.

Having now described the invention, what I claim as new and desire to secure by Letters Patent, is:

1. Cock apparatus, for selectively connecting a plurality of passages in a fluid control system, comprising:
   (a) a cock body having fluid passages therethrough to be selectively connected and a formed hole into which said passages open;
   (b) a sleeve of elastomeric material formed for insertion into said body hole;
   (c) a plug element shaped for placement within said sleeve in said body hole and freely operable for selectively connecting in predetermined patterns said fluid passages opening into said hole;
   (d) at least one set of adjacent surfaces formed between said hole and said sleeve and between said sleeve and said plug element being tapered;
   (e) a first annular space at the top of said sleeve, said first annular space formed by an interior surface of said cock body, said top of said sleeve and the outer surface of said plug element, said first annular space allowing upward movement of said sleeve as said sleeve becomes worn;
   (f) a second annular space at the bottom of said sleeve, said second annular space formed by said interior surface of said cock body, said bottom of said sleeve and said outer surface of said plug element;
   (g) a bearing plate to provide a uniform pressure distribution on said sleeve, said bearing plate having a first side adjacent to and in contact with said bottom of said sleeve at the thickest end thereof;
   (h) a spring pushing means inserted within said second annular space with one end thereof being positioned for bearing engagement with a second side of said bearing plate for urging said sleeve upwardly into tight surface contact with said hole and said plug as said sleeve wears; and
   (i) a base element for closing the bottom of said cock apparatus and for providing a bearing surface which cooperates with said spring pushing means for urging said sleeve upwardly, said base element and said plug element being formed as a single piece.

2. Cock apparatus as defined in claim 1 in which, said sleeve is composed of rubber.

3. Cock apparatus as defined in claim 1 in which, the adjacent contacting surfaces of said hole and said sleeve are tapered.

4. Cock apparatus as defined in claim 1 in which, the adjacent rubbing surfaces of said sleeve and said plug are tapered.

* * * * *